US007886112B2

(12) United States Patent
Ohtsuka

(10) Patent No.: US 7,886,112 B2
(45) Date of Patent: Feb. 8, 2011

(54) METHODS AND APPARATUS FOR PROVIDING SIMULTANEOUS SOFTWARE/HARDWARE CACHE FILL

(75) Inventor: Katsushi Ohtsuka, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/444,803

(22) Filed: Jun. 1, 2006

(65) Prior Publication Data
US 2007/0277000 A1   Nov. 29, 2007

Related U.S. Application Data

(60) Provisional application No. 60/808,170, filed on May 24, 2006.

(51) Int. Cl.
*G06F 13/00* (2006.01)
(52) U.S. Cl. .................. 711/137; 711/206; 711/118
(58) Field of Classification Search ............ 711/3, 711/122, 133, 137, 144, 145, 202–209, 118
See application file for complete search history.

(56) References Cited

U.S. PATENT DOCUMENTS

| | | | | |
|---|---|---|---|---|
| 5,440,710 | A | * | 8/1995 | Richter et al. ............... 711/207 |
| 5,493,660 | A | * | 2/1996 | DeLano et al. .............. 711/206 |
| 5,918,250 | A | * | 6/1999 | Hammond ................... 711/205 |
| 5,918,251 | A | * | 6/1999 | Yamada et al. .............. 711/207 |
| 6,134,633 | A | * | 10/2000 | Jacobs ........................ 711/137 |
| 6,526,491 | B2 | | 2/2003 | Yamazaki et al. |
| 6,839,813 | B2 | | 1/2005 | Chauvel |
| 6,854,046 | B1 | * | 2/2005 | Evans et al. .................. 711/203 |
| 6,938,252 | B2 | * | 8/2005 | Baylor et al. ............... 718/102 |
| 7,103,748 | B2 | | 9/2006 | Day et al. |
| 7,558,939 | B2 | * | 7/2009 | Banerjee et al. ............. 711/205 |
| 7,711,903 | B2 | | 5/2010 | Day et al. |
| 2002/0062424 | A1 | | 5/2002 | Liao et al. |
| 2002/0065993 | A1 | | 5/2002 | Chauvel |
| 2002/0138701 | A1 | | 9/2002 | Suzuoki et al. |

(Continued)

FOREIGN PATENT DOCUMENTS

CN    1641606 A    7/2005

(Continued)

OTHER PUBLICATIONS

Zucker, D. F.; Lee, R. B. and Flynn, M.J., Hardware and software cache prefetching techniques for MPEG benchmarks, Circuits and Systems for Video Technology, IEEE Transactions on, vol. 10, Issue 5, Aug. 2000 pp. 782-796.*

(Continued)

*Primary Examiner*—Hong Kim
(74) *Attorney, Agent, or Firm*—Matthew B. Dernier, Esq.; Gibson & Dernier LLP

(57) ABSTRACT

Methods and apparatus provide a hardware implemented cache refill circuit for managing at least one address translation table cache, the at least one address translation table cache containing data used to translate an external address into a physical address of a processing system; provide a software implemented cache refill function also for managing the at least one address translation table cache; and simultaneously refill the at least one address translation table cache using the hardware implemented cache refill circuit and the software implemented cache refill function.

22 Claims, 11 Drawing Sheets

U.S. PATENT DOCUMENTS

| | | | |
|---|---|---|---|
| 2003/0140244 A1* | 7/2003 | Dahan et al. | 713/200 |
| 2004/0117592 A1 | 6/2004 | Day et al. | |
| 2004/0168046 A1* | 8/2004 | Teruyama | 712/228 |
| 2005/0071571 A1* | 3/2005 | Luick | 711/137 |
| 2005/0160229 A1* | 7/2005 | Johns et al. | 711/137 |
| 2005/0182903 A1* | 8/2005 | Kinter et al. | 711/133 |
| 2006/0026365 A1* | 2/2006 | Yamazaki | 711/137 |
| 2006/0112256 A1* | 5/2006 | Lee | 711/205 |
| 2006/0179236 A1* | 8/2006 | Shafi | 711/137 |
| 2007/0022250 A1* | 1/2007 | Fields et al. | 711/133 |
| 2007/0113044 A1* | 5/2007 | Day et al. | 711/207 |
| 2007/0136532 A1* | 6/2007 | Irish et al. | 711/133 |
| 2007/0143565 A1* | 6/2007 | Corrigan et al. | 711/202 |
| 2007/0277000 A1* | 11/2007 | Ohtsuka | 711/133 |

FOREIGN PATENT DOCUMENTS

| | | |
|---|---|---|
| EP | 1182571 A2 | 2/2002 |
| EP | 1 235 154 A2 | 8/2002 |
| WO | 2004053698 A2 | 6/2004 |

OTHER PUBLICATIONS

Zhenlin Wang; Burger, D.; McKinley, K.S.; Reinhardt, S.K.; Weems, C.C., Guided region prefetching: a cooperative hardware/software approach, Computer Architecture, 2003. Proceedings. 30th Annual International Symposium on, Jun. 9-11, 2003 pp. 388-398.*

Tien-Fu Chen and Baer, J.-L., A performance study of software and hardware data prefetching schemes, Computer Architecture, 1994. Proceedings the 21st Annual International Symposium on, Apr. 18-21, 1994 pp. 223-232.*

Se-Jin Hwang and Myong-Soon Park, Software data prefetching to reduce data reloading overhead, Computer Architectures for Machine Perception, 1995. Proceedings. CAMP '95, Sep. 18-20, 1995 pp. 190-195.*

Jacob B.L. et al., "A Look at Several Memory Management Units, TLB-Refill Mechanisms, and Page Table Organizations", University of Maryland, University of Michigan, ACM, 1998. pp. 295-306.*

Andrew S. Tanenbaum, "Structured Computer Organization", Prentice-Hall, Inc., 1984. 1.4. Hardware, Software, and Multilevel Machines, pp. 10-12.*

U.S. Appl. No. 11/621,315.

International Search Report and the Written Opinion of the International Application No. PCT/JP2007/000556.

Office Action for corresponding Chinese Patent Application 200780000537.6, dated Sep. 26, 2010.

European Search report for corresponding EP application 07737212.6, dated Sep. 29, 2010.

* cited by examiner

METHODS AND APPARATUS FOR PROVIDING SIMULTANEOUS SOFTWARE/HARDWARE CACHE FILL

CROSS REFERENCE TO RELATED APPLICATION

This application claims the benefit of U.S. Provisional Patent Application No. 60/808,170, filed May 24, 2006, entitled METHODS AND APPARATUS FOR PROVIDING SIMULTANEOUS SOFTWARE/HARDWARE CACHE FILL, the entire disclosure of which is hereby incorporated by reference.

BACKGROUND

The present invention relates to methods and apparatus for translating address from an external memory space to the memory space of a processor using a simultaneous hardware and software cache fill feature.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

A suitable processing system for executing such applications may include one or more processors and a memory. In some processing systems, it may be desirable to transfer data from an external system (such as another processing system, a CCD or the like) into the memory of the processing system. As the memory space visible to the external system may be translated with respect to the memory space of the processing system, it may be necessary to translate the memory addresses of the external system associated with the transfer of data into the memory of the processing system. It is desirable to make this translation quickly in order to meet speed objective for the processing system.

SUMMARY OF THE INVENTION

One or more embodiments of the present invention may provide for an improved technique for translating addresses of an external system using a combination hardware and software cache feature such that data from the external system may be stored in an internal memory space of a processing system, such as a multi-processor based architecture. Although the invention may be used in many applications, advantages are obtained when it is used to facilitate both predictable data accesses (e.g., streaming video) and unpredictable data accesses.

Data accesses in a streaming video application or drawing/texture application require real time response (and low jitter). Such data accesses are relatively predictable because the access addresses and timing from the requesting I/O device can be predetermined. Thus, a software implemented cache refill mechanism may be used to pre-load data (prior to a cache miss) to improve processing efficiency and reduce jitter. Notably, however, in the event of a cache miss, a software implemented cache refill may take on the order of several micro-seconds to complete. This is not sufficiently fast to accommodate all types of data accesses (particularly those requiring real time, low jitter results). A hardware implemented cache refill mechanism exhibits a generally faster refill speed (on the order of several hundred nano-seconds). However, this is still not sufficiently fast for some performance critical accesses and will result in significant jitter in, for example streaming video applications.

In accordance with one or more embodiments of the invention, both hardware and software cache refill mechanisms are provided, where both mechanisms may operate simultaneously. Thus, for example, data pre-loading may be accomplished even when the hardware cache refill mechanism is servicing a refill. The hardware and software cache refill mechanisms share the same cache entries, however, each entry has a lock bit that may be controlled only by the software mechanism. If an entry has been locked by software, the hardware mechanism must use another cache way. In a preferred implementation, the software mechanism handles the predictable data accesses, while the hardware mechanism handles the unpredictable data accesses. This results in higher processing efficiency and reduced jitter, which is to say better real time results are obtained.

In accordance with one or more embodiments, a methods and apparatus enable: providing a hardware implemented cache refill circuit for managing at least one address translation table cache, the at least one address translation table cache containing data used to translate an external address into a physical address of a processing system; and providing a software implemented cache refill function operable to pre-load the at least one address translation table cache prior to a cache miss. The pre-loading step reserves one or more cache lines of the at least one address translation table cache and one or more associated physical memory locations, addressed by the physical addresses, in a memory of the processing system. The pre-loading step may include locking one or more of the cache lines of the at least one address translation table cache against a refill by the hardware implemented cache refill circuit.

In accordance with one or more embodiments, a methods and apparatus enable: simultaneously refilling the at least one address translation table cache using the hardware implemented cache refill circuit and the software implemented cache refill function.

In accordance with one or more embodiments, a methods and apparatus enable: providing a hardware implemented cache refill circuit for managing at least one address translation table cache, the at least one address translation table cache containing data used to translate an external address into a physical address of a processing system; providing a software implemented cache refill function also for managing the at least one address translation table cache and to pre-load the at least one address translation table cache prior to a cache miss; and simultaneously refilling the at least one address translation table cache using the hardware implemented cache refill circuit and the software implemented cache refill function.

The at least one address translation table cache includes at least one segment table cache, each cache line of the segment table cache representing a different segment of a memory of the processing system. The at least one address translation table cache includes at least one page table cache, each entry in the page table cache including at least a portion of a physical address in the memory and belonging to a group of entries representing a page in the selected segment of the memory.

The methods and apparatus enable: permitting the software implemented cache refill function to reserve one or more cache lines of the at least one address translation table cache and one or more associated physical memory locations, addressed by the physical addresses, in the memory of the processing system. Alternatively or additionally, the methods and apparatus enable permitting the software implemented cache refill function to lock the one or more of the cache lines against a refill by the hardware implemented cache refill circuit.

The a methods and apparatus may further provide for: adding a base address to the external address to produce at least a portion of an intermediate address; using a first portion of the intermediate address as a pointer to select one of the cache lines of the segment table cache; using at least a portion of the selected cache line of the segment table cache as a reference to a plurality of cache lines of the page table cache; and using another portion of the intermediate address as a pointer to one of the referenced entries in the page table cache to obtain an at least partially translated physical address into the memory for the external address.

One or more cache lines of the segment table cache may include: one or more bits indicative of whether the given cache line is valid; one or more bits indicative of a page number of the page table cache; one or more bits indicative of a page size of the page table cache; and/or one or more bits providing the reference to the plurality of cache lines of the page table cache.

One or more cache lines of the page table cache may include: one or more bits indicative of whether the given cache line is valid; one or more bits indicative of whether the given cache line has been locked, prior to a cache miss, by the software implemented cache refill function against a refill by the hardware implemented cache refill circuit; and/or one or more bits representing the at least portion of the physical address in the memory.

The a methods and apparatus may further provide for: augmenting the one or more bits of the selected cache line of the page table cache representing the at least portion of the physical address with one or more least significant bits of the intermediate address to produce the translated physical address for the external address.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
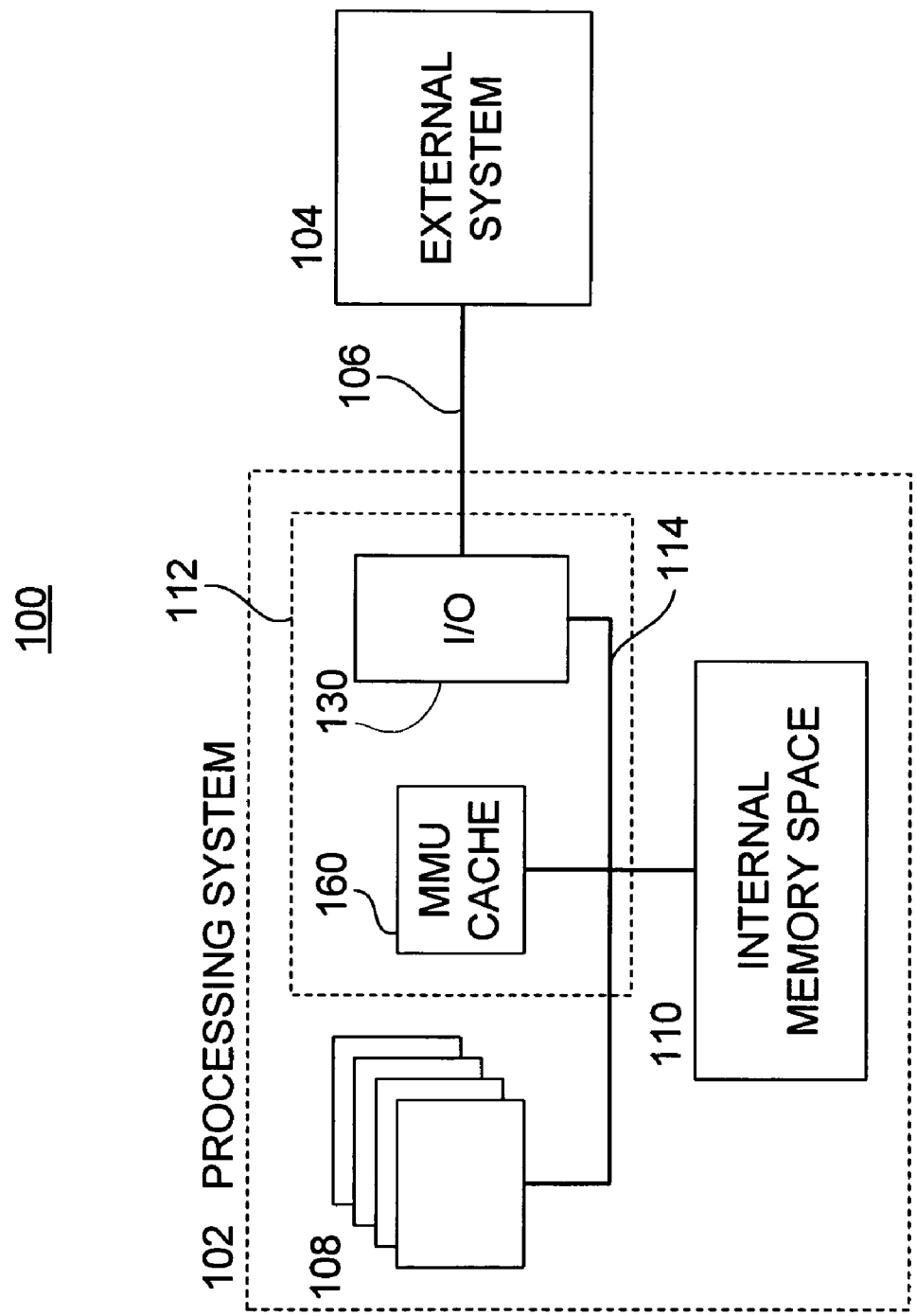
FIG. 1 is a block diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The system 100 includes a processing system 102 and at least one external system 104 (e.g., I/O device) coupled to one another over one or more buses 106. The processing system 102 may include one or more processors 108, an internal memory space 110 (one or more memory units), and an I/O address translator circuit 112, coupled to one another over a bus 114. It is noted that the functional partitions illustrated in FIG. 1 are by way of example only and that other partitioning may be employed. It is understood that the system 100 might also include other devices, such as interface circuitry, peripheral circuitry, etc., but are omitted for the purposes of brevity and clarity.

The processors 108 may be implemented utilizing any of the known technologies that are capable of requesting data from the memory space 110, and manipulating the data to achieve a desirable result. For example, the processors 108 may be implemented using any of the known microprocessors that are capable of executing software and/or firmware, including standard microprocessors, distributed microprocessors, etc. By way of example, the processors 108 may be graphics processors that are capable of requesting and manipulating data, such as pixel data, including gray scale information, color information, texture data, polygonal information, video frame information, etc.

In some processing contexts the external system 104 may seek to read or write data from/to the internal memory space 110 of the processing system 102. In this regard, the address translator circuit 112 is preferably operable to translate a virtual address (external address of a differing memory space) received from the external system 104 into a physical address of the internal memory space 110. Indeed, the external system 104 may not operate in the same memory space as the memory space 110 and, therefore, address translation is required.

Figure 2:
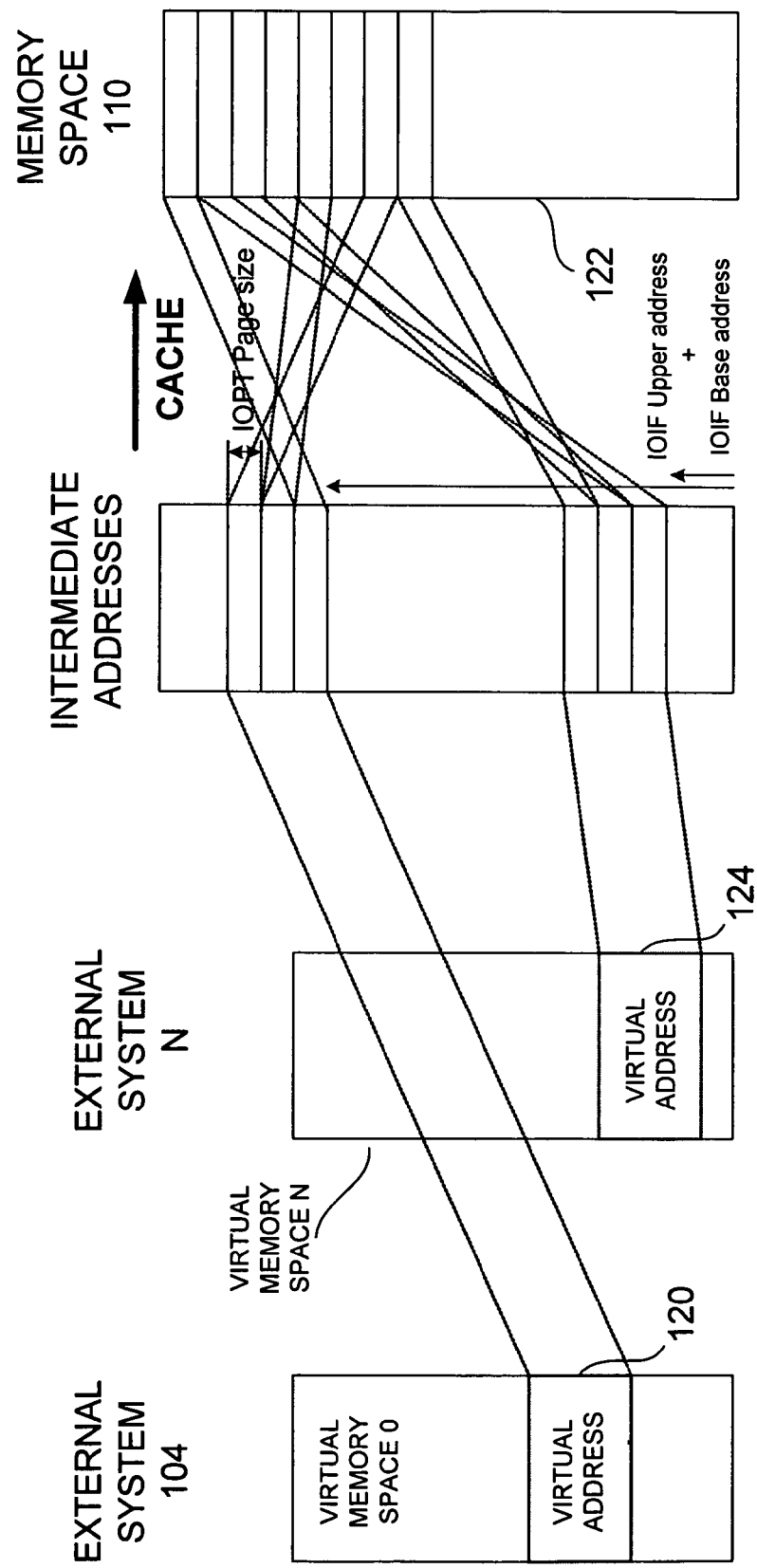
FIG. 2 is a conceptual diagram illustrating address translation that may be carried out by the system of FIG. 1.

With reference to FIG. 2, the memory 110 is preferably divisible into a number of segments, e.g., segment 0, segment 1, segment 2, etc. Each segment is preferably divisible into a plurality of pages. While the memory 110 enjoys its own physical space, the external system 104 operates in a virtual space (at least with respect to the processing system 102, e.g., virtual space 0, which is not a one-for-one identical space as the physical space of the memory 110. The address translator circuit 112 is operable to convert addresses 120 of the virtual space 0 to physical addresses 122 of the memory space 110. As there may be one or more external systems 104, the address translator circuit 112 may be operable to translate addresses 124 of other virtual memory spaces, e.g., virtual memory space N into the physical addresses 122 of the internal memory space 110. In the translation from the virtual memory spaces 0, N to the internal memory space 110, the virtual addresses 120, 124 are base adjusted and subject to a caching scheme, which will be described in more detail below.

Figure 3:
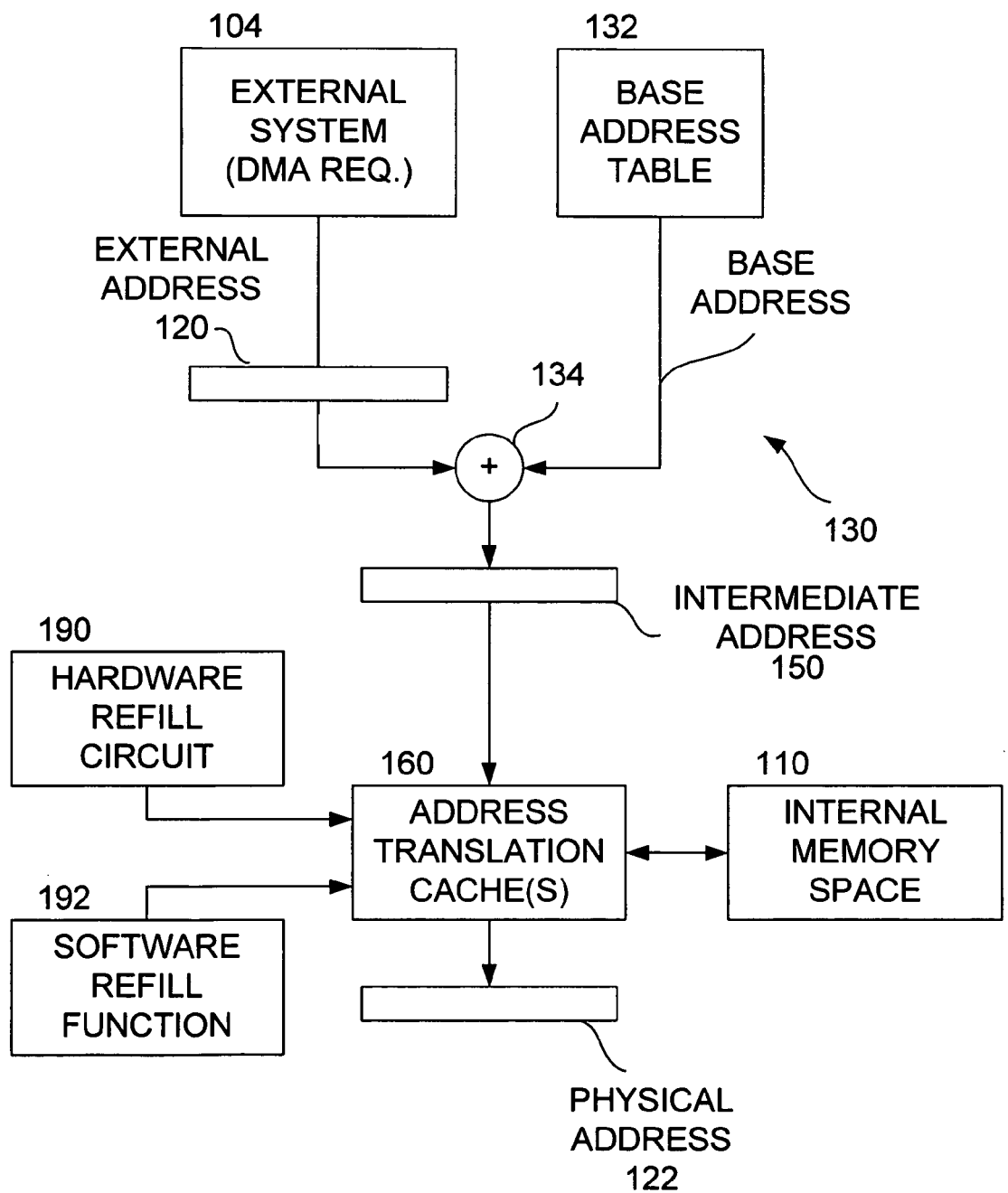
FIG. 3 is a block diagram illustrating a suitable structure for implementing one or more of the address translation functions of the processing system of FIG. 1.

Reference is now made to FIG. 3, which is a block diagram illustrating an example of how at least some portions of the address translator circuit 112 may be implemented. In this embodiment, the address translator circuit 112 may include a base address adjustment circuit 130, and one or more address translation caches 160. The processing system 102 may receive an external address (or virtual address) 120 from the external system 104. Again, this address may be associated with a request to read data from or write data to the memory space 110 of the processing system 102. It is noted that the read and/or write requests may be made in the context of direct memory access (DMA) requests made by the external system 104 (a DMA requestor). The base address adjustment circuit 130 may include a base address table 132 and an augmentation circuit 134 that are operable to receive the external address 120 from the external system 104 and add a base address (or offset) thereto to produce a first intermediate address 150.

Figure 4:
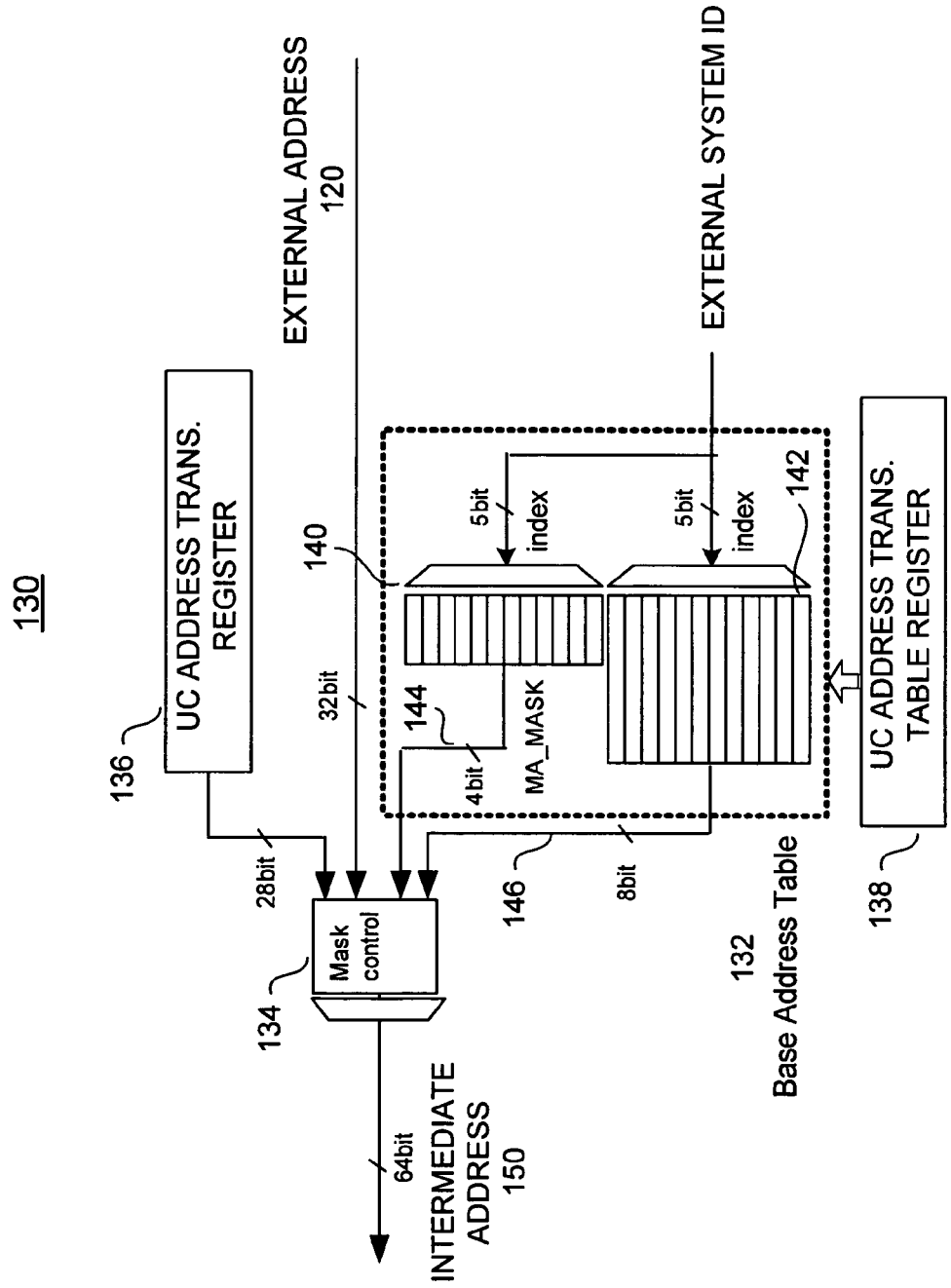
FIG. 4 is more detailed block diagram of a circuit suitable for augmenting an external address with a base address as employed in the structure of FIG. 3.

An example of a suitable circuit for implementing the base address adjustment circuit 130 is illustrated in FIG. 4. The augmentation circuit 134 may include a mask control circuit and a multiplexer, which receive at least one of: (i) a plurality of bits (e.g., 28 bits) from a portion of the UC address translation register 136; (ii) the external address 120 (e.g., 32 bits); (iii) and the base address output(s) 144, 146 from the base address table 132.

The UC address translation register 136 preferably establishes the most significant bits (e.g. the upper address range) of the intermediate address 150. The portion of the UC address translation register 136 that is used in producing the intermediate address 150 may include, for example, the lower bits (e.g. bits 22-27) thereof. The application software running on the processing system, preferably by way of system calls to operating system software, may set the content of the portion of the UC address translation register 136 as a function of the relative size of the internal memory space 110 (or portion thereof) and/or the size of the external memory space (or portion thereof) being mapped into the internal memory space 110.

The base address table 132 produces the base address output(s) 144, 146 based on an identification number (external system ID) of the external system 104 such that different base addresses may be produced for different external systems 104 (e.g., DMA requesters). The external system 104 may be implemented as one or more DMA requesters coupled to the processing system 102 via a south bridge device and/or an RSX graphics processing device. In such an implementation, the DMA requesters may include one or more of: disc drives, USB hubs, Ethernet switches, etc. By way of example, the external system ID may be 5 bits long in order to accommodate the number of different requesters—it being understood that the number of bits of the external system ID may be adjusted as desired or needed. In the illustrated embodiment, the base address table 132 output(s) may include one or more mask bits 144 (e.g., 4 bits) and one or more base address bits 146 (e.g., 8 bits). In this example, the base address table 132 may employ a plurality of configurable registers (or equivalent storage elements) 140, 142 that may be set by the UC address translation table register 138. Thus, the number of mask bits and base address bits (as well as the specific bit values) may be programmed. Again, the application software running on the processing system, preferably by way of system calls to operating system software, may set the content of the UC address translation table register 138 to establish the mask bits and base addresses 144, 146 for the respective external systems 104. As with the UC address translation register 136, the content of the UC address translation table register 138 may be established as a function of the relative sizes of the internal memory space 110 and/or the external memory space being mapped into the internal memory space 110. The external system IDs operate as indexes into the registers 140, 142 to produce the appropriate the mask bits and base addresses 144, 146 for input to the augmentation circuit 134.

Figure 5:
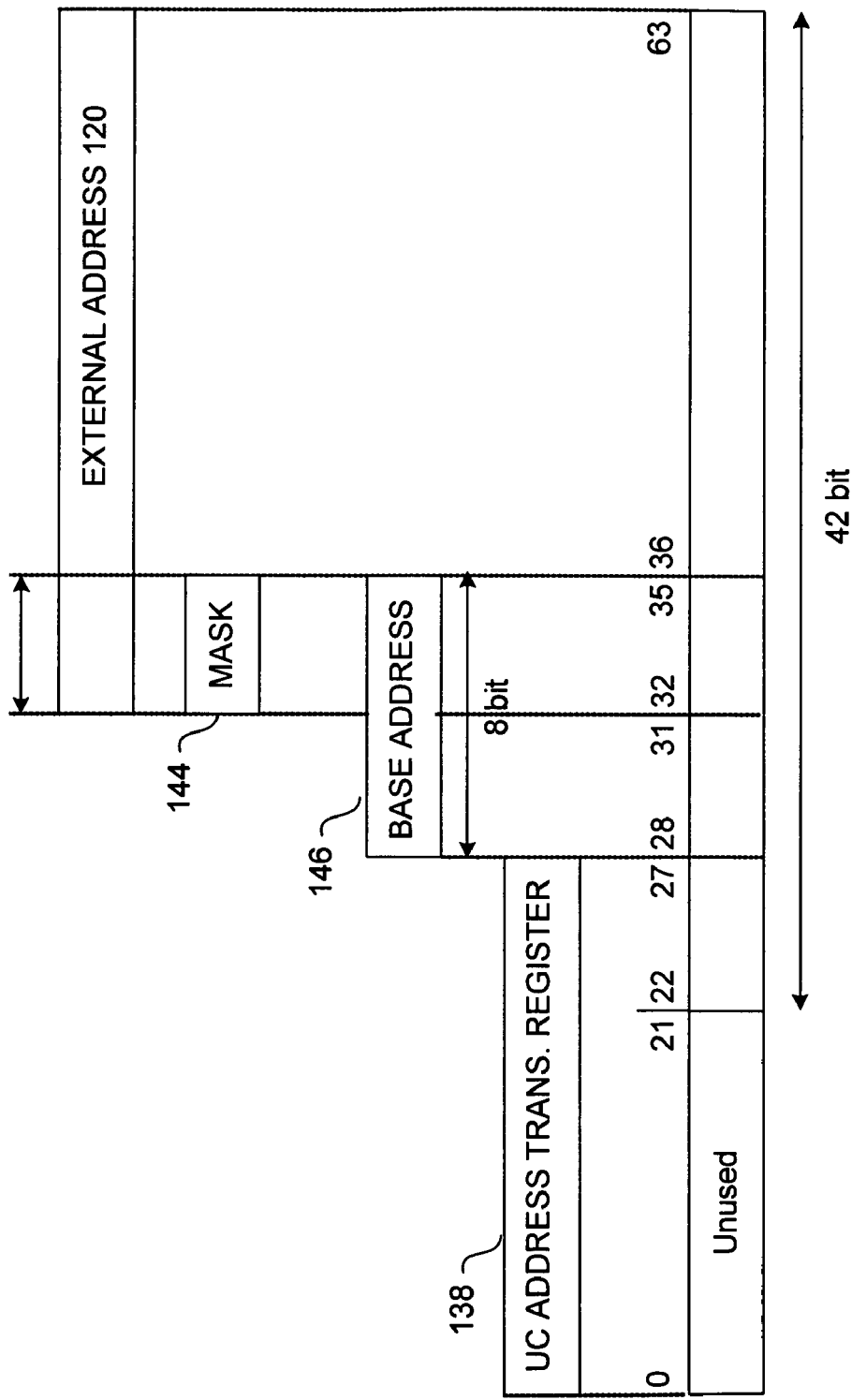
FIG. 5 is a conceptual diagram of the augmentation of the external address and the base address of FIG. 4.

FIG. 5 is a conceptual diagram of the augmentation of the external address 120 with the mask bits 144 and the base address 146 using the implementation example illustrated in FIG. 4. Thus, the external address 120 (32 bits) enters the base address translation circuit 130. The most significant bits of the external address 120 are masked by the mask bits 144 (in this example, 4 bits), leaving 28 bits available for the least significant bits of the intermediate address 150. The base address 146 (in this example 8 bits) is inserted into the next significant bit locations of the intermediate address 150. Finally, the most significant bits of the intermediate address 150 are established by the UC address translation register 136 or a portion thereof (in this example, 6 bits). Thus, in this embodiment, the intermediate address 150 is 64 bits in length.

Referring again to FIG. 3, the intermediate address 150 is used to obtain the physical address 122 of the internal memory space 110 through the address translation cache 160. The address translation cache 160 is managed by way of a hardware implemented cache refill circuit 190 and a software implemented cache refill function 192. Among the preferred features of the address translation cache 160 is that the hardware implemented cache refill circuit 190 and the software implemented cache refill function 192 may operate separately and/or simultaneously to refill the address translation cache 160. In a preferred embodiment, the software implemented cache refill function 192 handles predictable data accesses, while the hardware implemented cache refill circuit 190 handles the unpredictable data accesses. For example, the software implemented cache refill function 192 is preferably operable to pre-load the address translation cache 160 prior to a cache miss. This may be accomplished at the same time that the hardware implemented cache refill circuit 190 is servicing a cache refill.

The hardware implemented cache refill circuit 190 and the software implemented cache refill function 192 are preferably separately controlled or invoked by application software running on the processing system 102. For example, the application software is preferably operable to determine which of the hardware implemented cache refill circuit 190 or the software implemented cache refill function 192 is to operate in managing the address translation cache 160—and for how long. Alternatively, or in addition, the application software may be operable to determine that the hardware implemented cache refill circuit 190 and the software implemented cache refill function 192 may operate simultaneously in managing the address translation cache 160. In one or more embodiments, the application software preferably achieves the aforementioned control of the cache management by way of operating system calls, which control the hardware implemented cache refill circuit 190 and the software implemented cache refill function 192.

Figure 6:
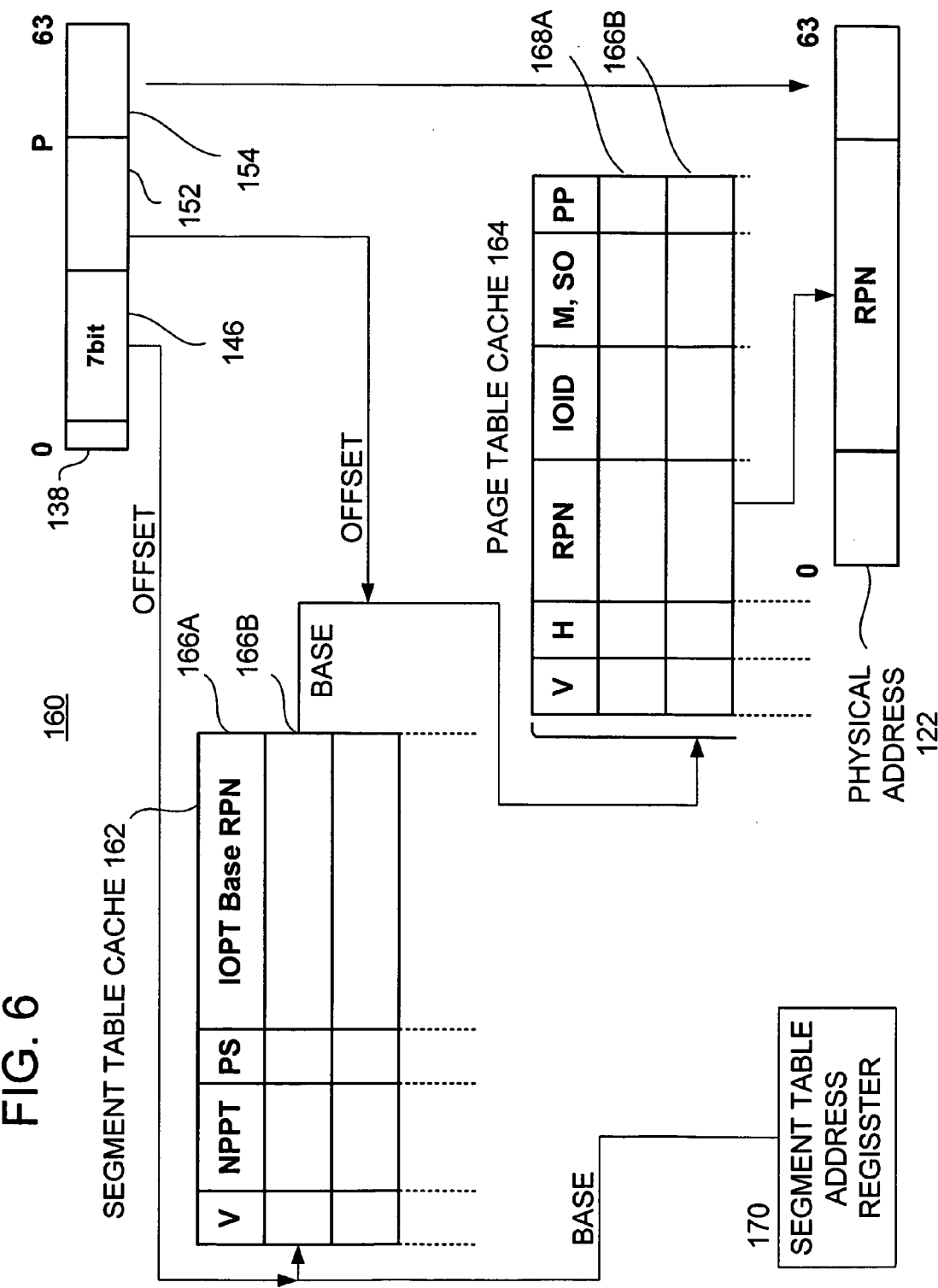
FIG. 6 is more detailed block diagram of a circuit suitable for implementing the cache system in the structure of FIG. 3.

With reference to FIG. 6, the address translation cache 160 may be implemented using at least one segment table cache 162 and at least one page table cache 164. The segment table cache 162 may be an N-way set associative cache or a direct mapped cache, depending on the particularities of the implementation. Each cache line 166A, 166B, 166C, etc. of the segment table cache 162 represents a different segment of the memory 110 of the processing system 100. For example, one or more cache lines 166 of the segment table cache 162 may include:
  (i) one or more bits (V) indicative of whether the given cache line 166 is valid;
  (ii) one or more bits (NPPT) indicative of a page number of the page table cache 164;
  (iii) one or more bits (PS) indicative of a page size of the page table cache 164; and/or
  (iv) one or more bits (IOPT Base RPN) providing a reference to a plurality of cache lines of the page table cache 164.

Each cache line (or group of cache lines) 166 of the segment table cache 162 may represent a different segment of the memory space 110.

The page table cache 164 may also be an N-way set associative cache or a direct mapped cache, depending on the particularities of the implementation. In a preferred embodiment, the page table cache 164 is an N-way set associative cache. Each cache line 168A, 168B, 168C, etc. of the page table cache 164 (if valid) includes at least a portion of the physical address 122 of the memory 110 that corresponds to an associated external address 120. Each of the cache lines 168 of the page table cache 164 belongs to a group of cache lines 168 representing a given page in one of the segments of the memory space 110. The cache lines 168 of the page table cache 164 may include:
  (i) one or more bits (V) indicative of whether the given cache line 168 is valid;
  (ii) one or more "hint" bits (H) indicative of whether the given cache line 168 has been locked (as will be discussed in more detail below);
  (iii) one or more bits (RPN) representing at least portion of a physical address 122 of the memory space 110 associated with a given external address 120;
  (iv) one or more bits (IOID) representing the I/O device identification number (e.g., the external system ID);
  (v) one or more bits (M,SO) providing cache coherency information (e.g. M=1 coherency required) and storage ordering information (e.g. SO=1 strict ordering required; and/or
  (vi) one or more bits (PP) indicating whether the memory location addressed by the physical address 122 is read only, write only or read/write.

Upon initialization of the system 100, the operating system may reserve some portion of the cache lines 168 of the page table cache 164. The reservation may be achieved by writing a predetermined logic levels to the valid bit V and the hint bit H for each such line. This reservation should be done while all I/O devices are not requesting reads and/or writes into the internal memory space 110. Also upon initialization, the page size of each segment in the memory space 110 may be specified, for example, by the processing system 102 or by the external system 104. This may be achieved via one or more system calls to the operating system. Although the page size may be specified, it is preferred that the page size be uniform from page-to-page and from segment-to-segment.

The software implemented cache refill function 192 is preferably operable to reserve one or more cache lines of the segment and/or page table caches 162, 164, and one or more associated physical memory locations, addressed by the physical addresses, in the memory space 110 of the processing system 102. This is preferably carried out before a cache miss, such as when predictable data are being processed and pre-loading of the caches 162, 164 is practical. The software implemented cache refill function 192 is preferably able to lock the cache lines 168 of the page table cache 164 against a refill by the hardware implemented cache refill circuit 190. By way of example, the locking feature may be achieved by setting the H bit(s) to a predetermined level, such as logic 1.

Figure 7:
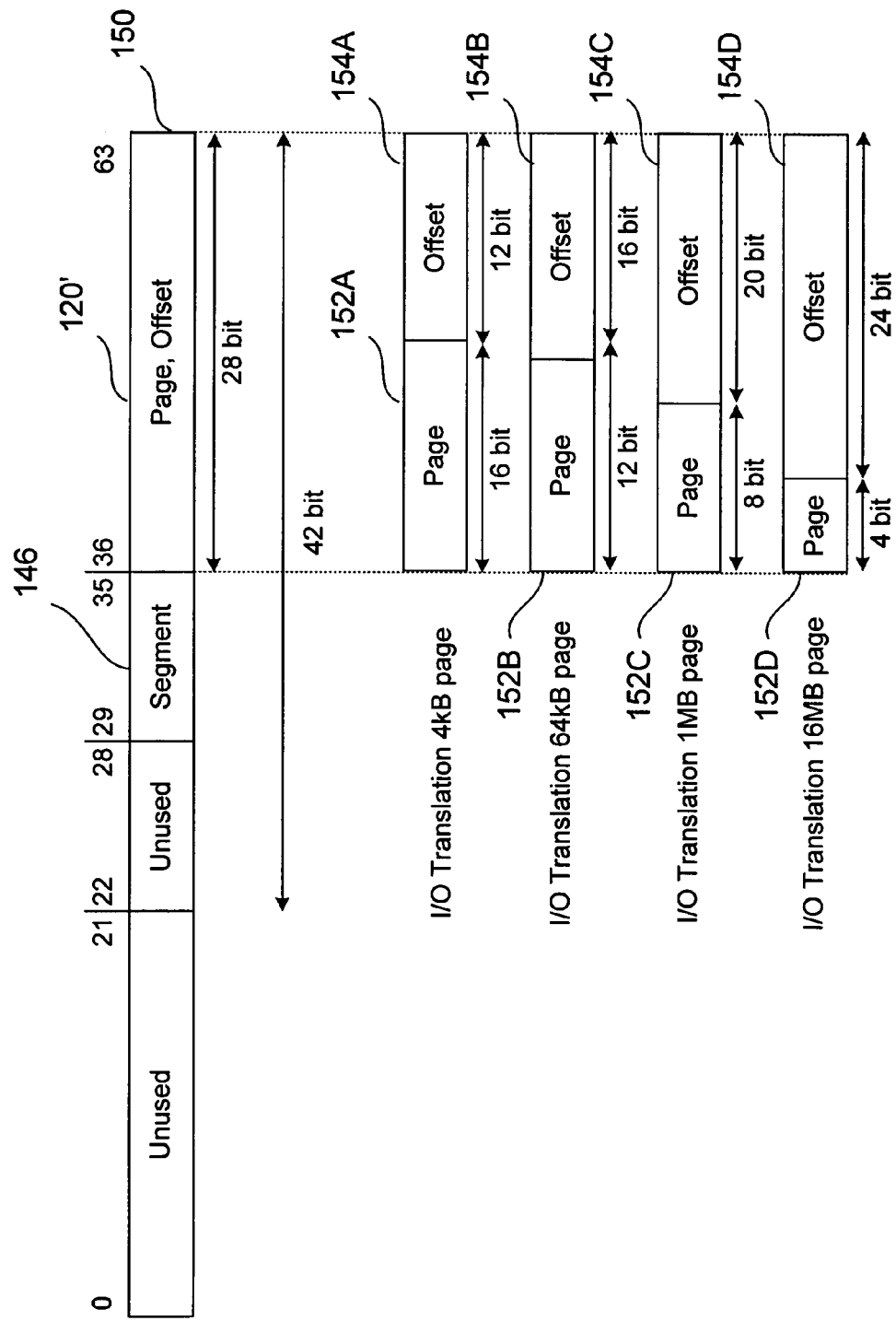
FIG. 7 is a conceptual diagram of at least part of the translation of the augmented external address (intermediate address) to a real address of the processing system.

The address translation cache 160 also includes a programmable segment table address register 170 that establishes base values, each for accessing a respective set of cache lines of the segment table cache 162. The base value of the segment table address register 170 augmented with the base address portion 146 of the intermediate address 150 may be used as a pointer (index) to select one of the cache lines 166 of the segment table cache 162. The IOPT Base RPN portion of the selected cache line 162 of the segment table cache 162 provides a base value index into the page table cache 164. The base value index of the selected cache line 162 of the segment table cache 162 augmented by another portion 152 of the intermediate address 150 may be used as a pointer (index) to select one of the cache lines 168 of the page table cache 164. The portion 152 of the intermediate address 150 corresponds to the higher significant bits of the external address 120' (that are not masked, see FIG. 5). The number of bits in the portion 152 depends on the page size. With reference to FIG. 7, and in keeping with the examples above, a 4 KB page size results in a 16-bit portion 152A, leaving 12-bits in the offset portion 154A. A 64 KB page size results in a 12-bit portion 152B, leaving 16-bits in the offset portion 154B. A 1 MB page size results in an 8-bit portion 152C, leaving 20-bits in the offset portion 154C. A 16 MB page size results in a 4-bit portion 152D, leaving 24-bits in the offset portion 154D.

Turning again to FIG. 6, assuming that the selected cache line 168 of the page table cache 164 is valid (e.g., V=logic 1), then the RPN portion of the cache line 168 is used as a part of the physical address 122 into the memory space 110 for the external address 120. The remaining portion of the physical address 122 is obtained by augmenting the RPN portion with the offset portion 154 of the intermediate address 150. If, however, the selected cache line 168 of the page table cache 164 is not valid (e.g., V=logic 0), then a cache miss occurs and the hardware implemented cache refill circuit 190 is employed to refill the segment and/or page table caches 162, 164. In this regard, the hardware implemented cache refill circuit 190 searches the cache lines for one or more invalid and/or unlocked cache lines and refills such lines. If no such invalid and/or unlocked cache lines are found, then an interrupt for a fault notification is issued. In other words, although the hardware and software cache refill mechanisms 190, 192 share the same cache lines, the lock bit (H) of the cache lines 164 of the page table cache 164 may be controlled only by the software mechanism 192. Thus, if a cache line 168 has been locked by the software mechanism 192, then the hardware mechanism 190 must use another cache way (or line).

As the hardware mechanism 190 is only permitted to replace cache lines 168 in which H=0, a practical software mechanism 192 need only write H=1 in order to pre-load the cache lines 168. Thus, if the software mechanism 192 needs to reserve cache lines 168, then the software should write H=1 for such cache lines 168 before a hardware mechanism 190 refill is enabled. In contrast, if software mechanism 192 needs to release previously reserved cache lines 168, then the software should write H=0 for such cache lines 168. The result of such release will be that from such time forward, the hardware mechanism 190 may use such cache lines 168 for refills. The above functionality applies to each specific way of a given congruence group. For example, if the N-way set associative cache 164 employs N=4, then each way of a given congruence may be separately locked. This is presented in the table below.

| WAY | V | H | Hardware Refill Available? |
|-----|---|---|----------------------------|
| 0   | 0 | 0 | YES                        |
| 1   | 0 | 1 | NO                         |
| 2   | 1 | 0 | YES                        |
| 3   | 1 | 1 | NO                         |

Figure 8:
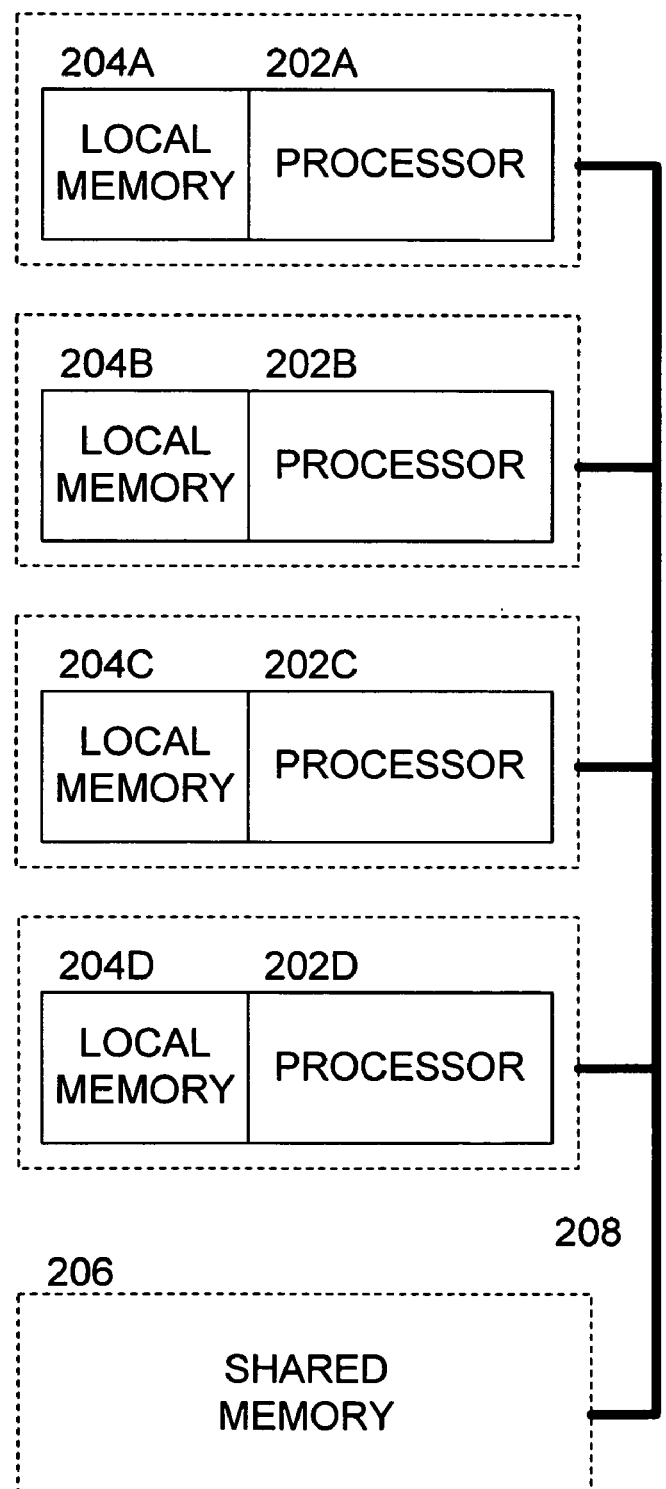
FIG. 8 is a diagram illustrating the structure of a multi-processing system having two or more sub-processors that may be adapted in accordance with one or more aspects of the present invention.

FIG. 8 illustrates a multi-processing system 100A that is adapted to implement one or more further embodiments of the present invention. The system 100A includes a plurality of processors 202A-D, associated local memories 204A-D, and a shared memory 206 interconnected by way of a bus 208. The shared memory 206 may also be referred to herein as a main memory or system memory. Although four processors 202 are illustrated by way of example, any number may be utilized without departing from the spirit and scope of the present invention. Each of the processors 202 may be of similar construction or of differing construction.

Although not shown, the system 100A preferably includes an address translator circuit 112 and other functionality discussed hereinabove.

The local memories 204 are preferably located on the same chip (same semiconductor substrate) as their respective processors 202; however, the local memories 204 are preferably not traditional hardware cache memories in that there are no on-chip or off-chip hardware cache circuits, cache registers, cache memory controllers, etc. to implement a hardware cache memory function.

The processors 202 preferably provide data access requests to copy data (which may include program data) from the system memory 206 over the bus 208 into their respective local memories 204 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 206 is preferably a dynamic random access memory (DRAM) coupled to the processors 202 through a high bandwidth memory connection (not shown). Although the system memory 206 is preferably a DRAM, the memory 206 may be implemented using other means, e.g., a static random access memory (SRAM), a magnetic random access memory (MRAM), an optical memory, a holographic memory, etc.

Each processor 202 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 202 may include an instruction buffer, instruction decode circuitry, dependency check circuitry, instruction issue circuitry, and execution stages.

The DMACs of the processors 202 are preferably operable to facilitate the transfer of a plurality of data blocks between the shared memory 206 and one or more of the local memories 204 in response to a single DMA command issued by one of the processors 202.

In one or more embodiments, the processors 202, the local memories 204, and the DMACs may be disposed on a common semiconductor substrate. In one or more further embodiments, the shared memory 206 may also be disposed on the common semiconductor substrate or it may be separately disposed.

In one or more alternative embodiments, one or more of the processors 202 may operate as a main processor operatively coupled to the other processors 202 and capable of being coupled to the shared memory 206 over the bus 208. The main processor may schedule and orchestrate the processing of data by the other processors 202. Unlike the other processors 202, however, the main processor may be coupled to a hardware cache memory, which is operable cache data obtained from at least one of the shared memory 206 and one or more of the local memories 204 of the processors 202. The main processor may provide data access requests to copy data (which may include program data) from the system memory 206 over the bus 208 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 9:
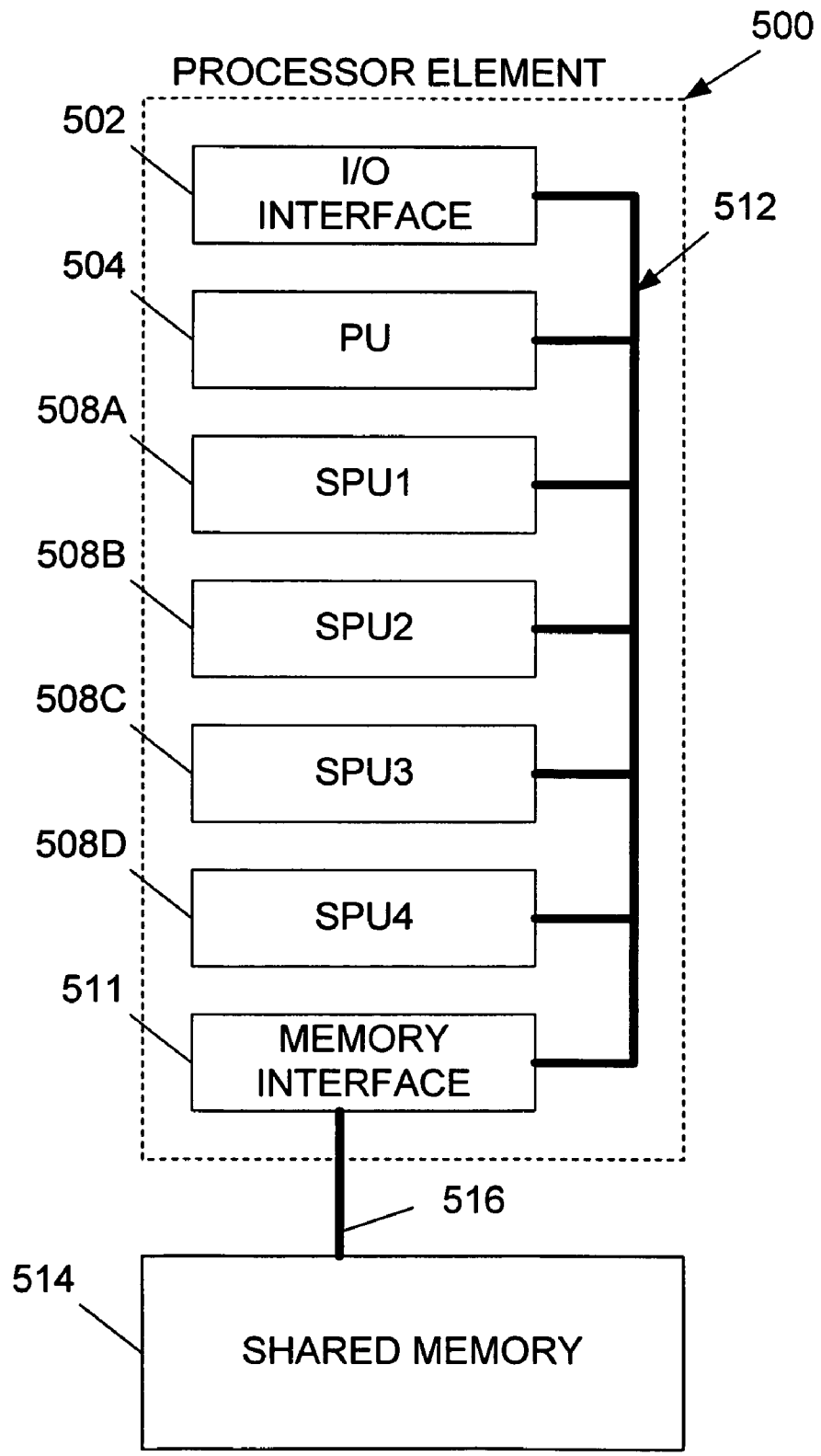
FIG. 9 is a diagram illustrating a preferred processor element (PE) that may be used to implement one or more further aspects of the present invention.

With reference to FIG. 9, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 10:
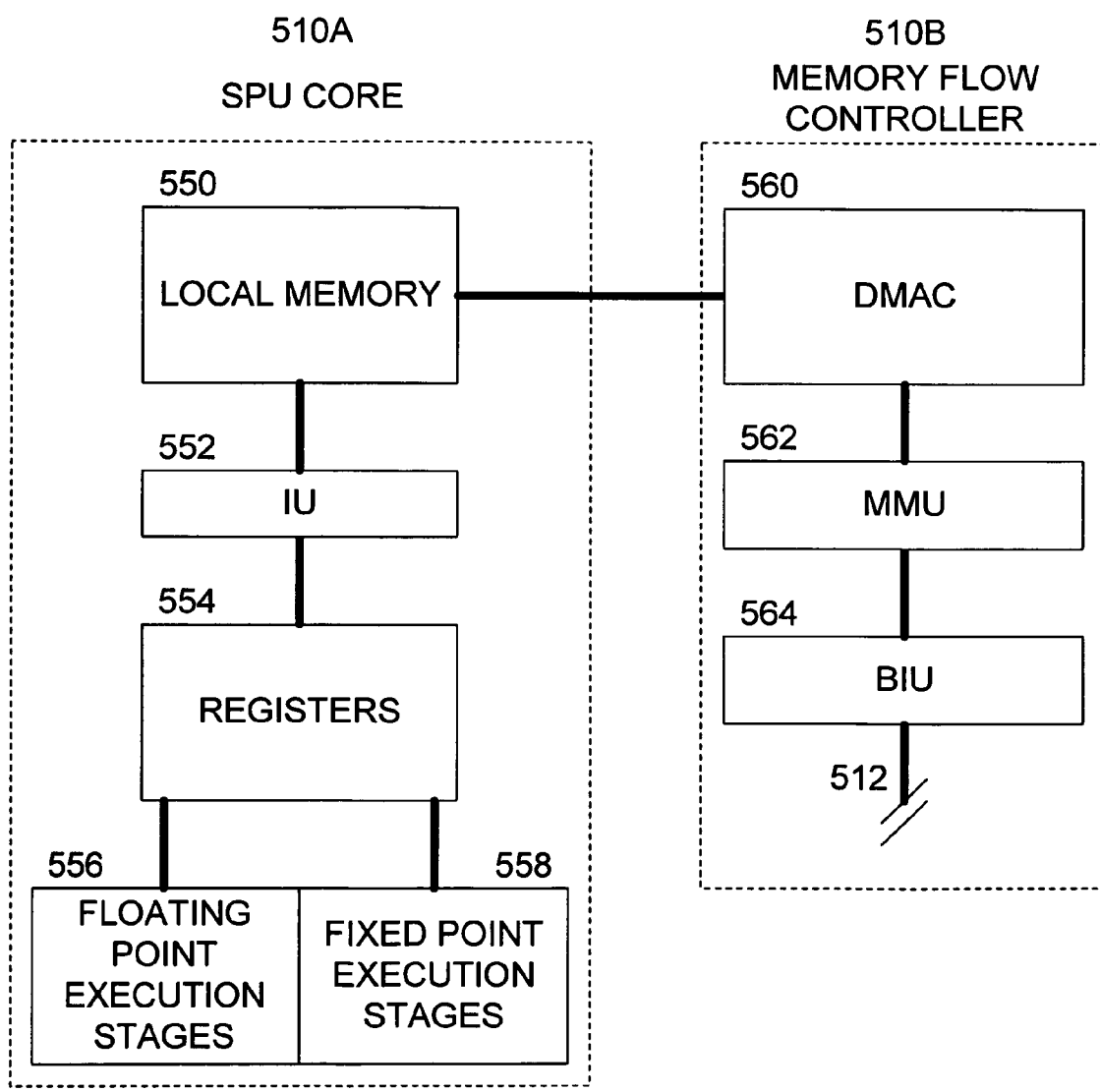
FIG. 10 is a diagram illustrating the structure of an exemplary sub-processing unit (SPU) of the system of FIG. 9 that may be adapted in accordance with one or more further aspects of the present invention.

FIG. 10 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 11:
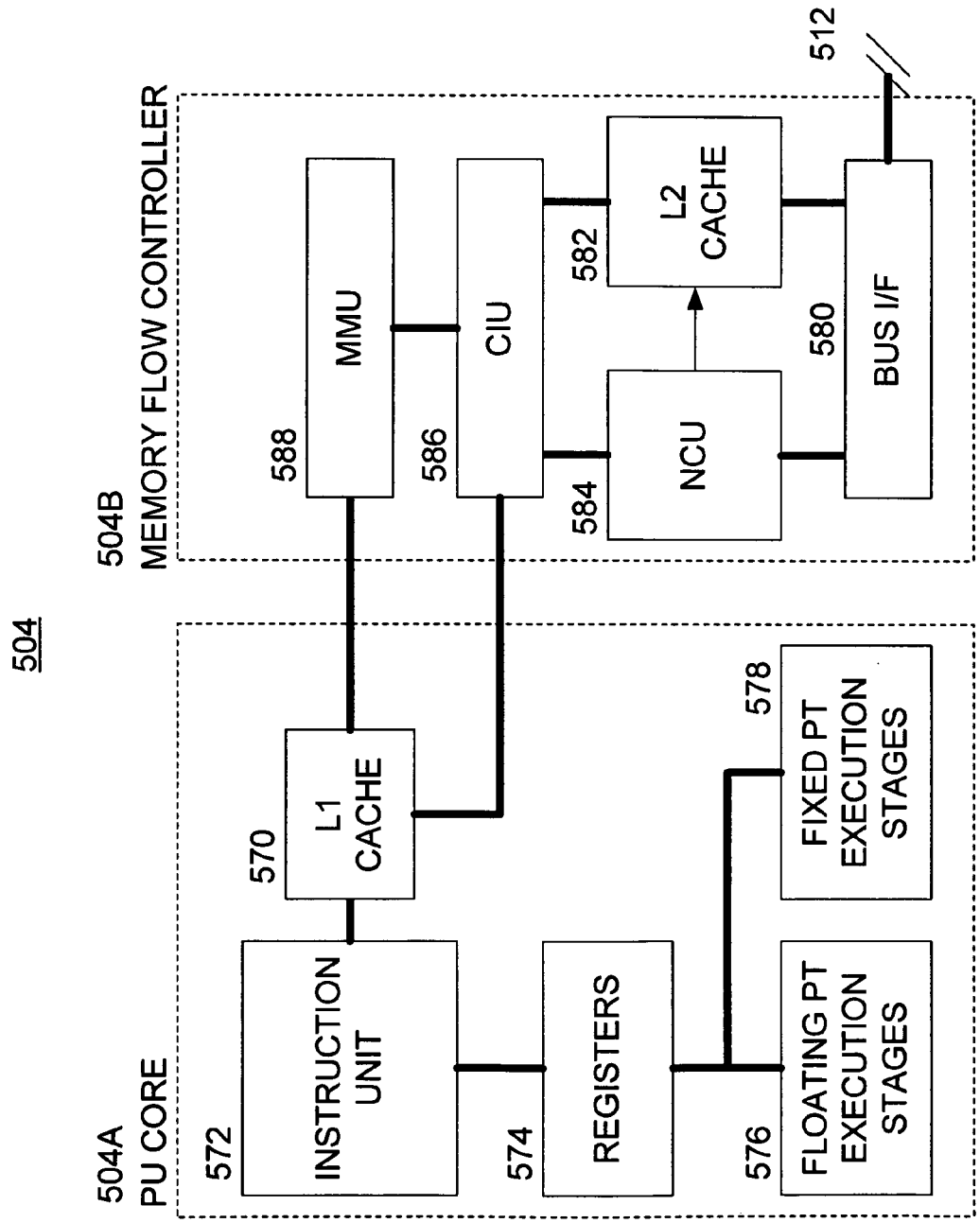
FIG. 11 is a diagram illustrating the structure of an exemplary processing unit (PU) of the system of FIG. 9 that may be adapted in accordance with one or more further aspects of the present invention.

FIG. 11 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
providing a hardware implemented cache refill circuit for managing at least one address translation table cache, the at least one address translation table cache containing data used to translate an external address into a physical address of a processing system;
providing a software implemented cache refill function operable to pre-load the at least one address translation table cache prior to a cache miss;
permitting application software, running on the processing system, to call operating system software of the processing system to: (i) control the hardware implemented cache refill circuit and the software implemented cache refill function to operate simultaneously in managing the at least one address translation table cache; and (ii) determine which of the hardware implemented cache refill circuit or the software implemented cache refill function is to operate, and which is not to operate, in managing the at least one address translation table cache.

2. The method of claim 1, wherein the pre-loading step reserves one or more cache lines of the at least one address translation table cache and one or more associated physical memory locations, addressed by the physical addresses, in a memory of the processing system.

3. The method of claim 1, wherein the pre-loading step includes locking one or more of the cache lines of the at least one address translation table cache against a refill by the hardware implemented cache refill circuit.

4. The method of claim 3, further comprising, after a cache miss:
searching, with the hardware implemented cache refill circuit, the cache lines of the at least one address translation table cache for one or more invalid and/or unlocked cache lines; and
refilling, with the hardware implemented cache refill circuit, the one or more invalid and/or unlocked cache lines.

5. The method of claim 4, further comprising: issuing an interrupt for a fault notification when there are no available invalid and/or unlocked cache lines.

6. An address translation circuit, comprising:
a hardware implemented cache refill circuit for managing at least one address translation table cache, the at least one address translation table cache containing data used to translate an external address into a physical address of a memory space; and
a software implemented cache refill function also for managing the at least one address translation table cache, wherein
the hardware implemented cache refill circuit and the software implemented cache refill function are operable to simultaneously refill the at least one address translation table cache, and
application software, running on the processing system, calls operating system software of the processing system to: (i) control the hardware implemented cache refill circuit and the software implemented cache refill function, to operate simultaneously in managing the at least one address translation table cache; and (ii) determine which of the hardware implemented cache refill circuit or the software implemented cache refill function is to operate, and which is not to operate, in managing the at least one address translation table cache.

7. The address translation circuit of claim 6, wherein:
the at least one address translation table cache includes at least one segment table cache, each cache line of the segment table cache representing a different segment of the memory space of the processing system; and
the at least one address translation table cache includes at least one page table cache, each entry in the page table cache including at least a portion of a physical address in the memory space and belonging to a group of entries representing a page in a given segment of the memory space.

8. The address translation circuit of claim 7, wherein the software implemented cache refill function is operable to reserve one or more cache lines of the at least one address translation table cache and one or more associated physical memory locations, addressed by the physical addresses, in the memory space.

9. The address translation circuit of claim 8, wherein the software implemented cache refill function is operable to lock the one or more of the cache lines against a refill by the hardware implemented cache refill circuit after a cache miss.

10. A method, comprising:
providing a hardware implemented cache refill circuit for managing at least one address translation table cache, the at least one address translation table cache containing data used to translate an external address into a physical address of a processing system;
providing a software implemented cache refill function also for managing the at least one address translation table cache;
permitting application software, running on the processing system, to call operating system software of the processing system to determine which of the hardware implemented cache refill circuit or the software implemented cache refill function is to operate, and which is not to operate, in managing the at least one address translation table cache;
refilling the at least one address translation table cache using one of the hardware implemented cache refill circuit and the software implemented cache refill function determined by the application or operating system software;
permitting application software, running on the processing system, to call operating system software of the processing system, which controls the hardware implemented cache refill circuit and the software implemented cache refill function, to operate simultaneously in managing the at least one address translation table cache; and
refilling the at least one address translation table cache simultaneously using the hardware implemented cache refill circuit and the software implemented cache refill function.

11. The method of claim 10, wherein the software implemented cache refill function operates to pre-load the at least one address translation table cache prior to a cache miss.

12. The method of claim 11, wherein:
the at least one address translation table cache includes at least one segment table cache, each cache line of the segment table cache representing a different segment of a memory of the processing system; and
the at least one address translation table cache includes at least one page table cache, each entry in the page table cache including at least a portion of a physical address in the memory and belonging to a group of entries representing a page in the selected segment of the memory.

13. The method of claim 12, further comprising: permitting the software implemented cache refill function to reserve one or more cache lines of the at least one address translation table cache and one or more associated physical memory locations, addressed by the physical addresses, in the memory of the processing system.

14. The method of claim 13, further comprising: permitting the software implemented cache refill function to lock the one or more of the cache lines against a refill by the hardware implemented cache refill circuit.

15. The method of claim 12, further comprising:
adding a base address to the external address to produce at least a portion of an intermediate address;
using a first portion of the intermediate address as a pointer to select one of the cache lines of the segment table cache;
using at least a portion of the selected cache line of the segment table cache as a reference to a plurality of cache lines of the page table cache; and
using another portion of the intermediate address as a pointer to one of the referenced entries in the page table cache to obtain an at least partially translated physical address into the memory for the external address.

16. The method of claim 15, wherein one or more cache lines of the segment table cache include at least one of:
one or more bits indicative of whether the given cache line is valid;
one or more bits indicative of a page number of the page table cache;
one or more bits indicative of a page size of the page table cache; and
one or more bits providing the reference to the plurality of cache lines of the page table cache.

17. The method of claim 15, wherein one or more cache lines of the page table cache include at least one of:
one or more bits indicative of whether the given cache line is valid;
one or more bits indicative of whether the given cache line has been locked, prior to a cache miss, by the software implemented cache refill function against a refill by the hardware implemented cache refill circuit; and
one or more bits representing the at least portion of the physical address in the memory.

18. The method of claim 15, further comprising augmenting the one or more bits of the selected cache line of the page table cache representing the at least portion of the physical address with one or more least significant bits of the intermediate address to produce the translated physical address for the external address.

19. An apparatus, comprising:
at least one processor coupled to a memory; and
an address translation circuit operable to translate a virtual address received from an external device into a physical address of the memory, wherein the address translation circuit includes:
a hardware implemented cache refill circuit for managing at least one address translation table cache, the at least one address translation table cache containing data used to translate the external address into the physical address; and
a software implemented cache refill function also for managing the at least one address translation table cache,
wherein: (i) application software, running on the processing system, calls operating system software of the processing system, which controls the hardware implemented cache refill circuit and the software implemented cache refill function, to operate simultaneously in managing the at least one address translation table cache, and to determine which of the hardware implemented cache refill circuit or the software implemented cache refill function is to operate, and which is not to operate, in managing the at least one address translation table cache; (ii) the hardware implemented cache refill circuit and the software implemented cache refill function are operable to simultaneously refill the at least one address translation table cache; and (iii) the software implemented cache refill function is operable to pre-load the at least one address translation table cache prior to a cache miss.

20. The apparatus of claim 19, wherein the software implemented cache refill function is operable to reserve one or more cache lines of the at least one address translation table cache and one or more associated physical memory locations, addressed by the physical addresses, in the memory of the processor.

21. The apparatus of claim 20, wherein the software implemented cache refill function is operable to lock one or more of the cache lines of the at least one address translation table cache against a refill by the hardware implemented cache refill circuit.

22. A system, comprising:
an internal memory space;
at least one processor operatively coupled to the memory space;
at least one segment table cache, each cache line of the segment table cache representing a different segment of the memory space;
at least one page table cache, each entry in the page table cache including at least a portion of a physical address in the memory space and belonging to a group of entries representing a page in a given segment of the memory space;
a hardware implemented cache refill circuit for managing the segment and page table caches; and
a software implemented cache refill function also for managing the segment and page table caches,
wherein: (i) application software, running on the processing system, calls operating system software of the processing system, which controls the hardware implemented cache refill circuit and the software implemented cache refill function, to operate simultaneously in managing the at least one address translation table cache, and to determine which of the hardware implemented cache refill circuit or the software implemented cache refill function is to operate, and which is not to operate, in managing the at least one address translation table cache; (ii) the hardware implemented cache refill circuit and the software implemented cache refill function are adapted to operate simultaneously; and (iii) the software implemented cache refill function is operable to pre-load the segment and page table caches prior to a cache miss.

* * * * *